Dec. 13, 1960 H. T. KRAFT 2,963,743
APPARATUS FOR MOLDING A SEAMLESS ANNULAR TREAD BAND
Filed Oct. 7, 1958 3 Sheets-Sheet 1
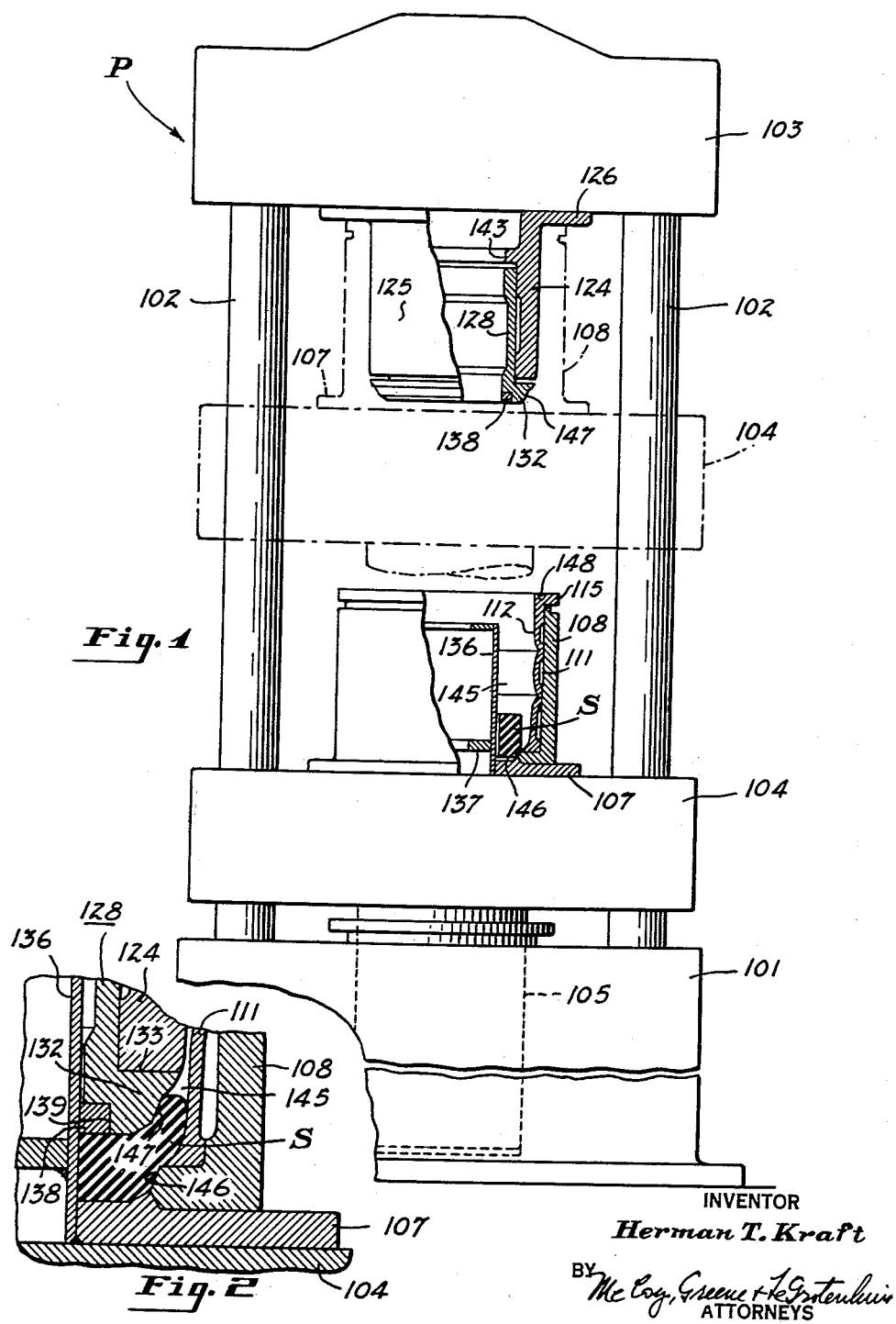
INVENTOR
*Herman T. Kraft*
BY *McCoy, Greene & Te...*
ATTORNEYS

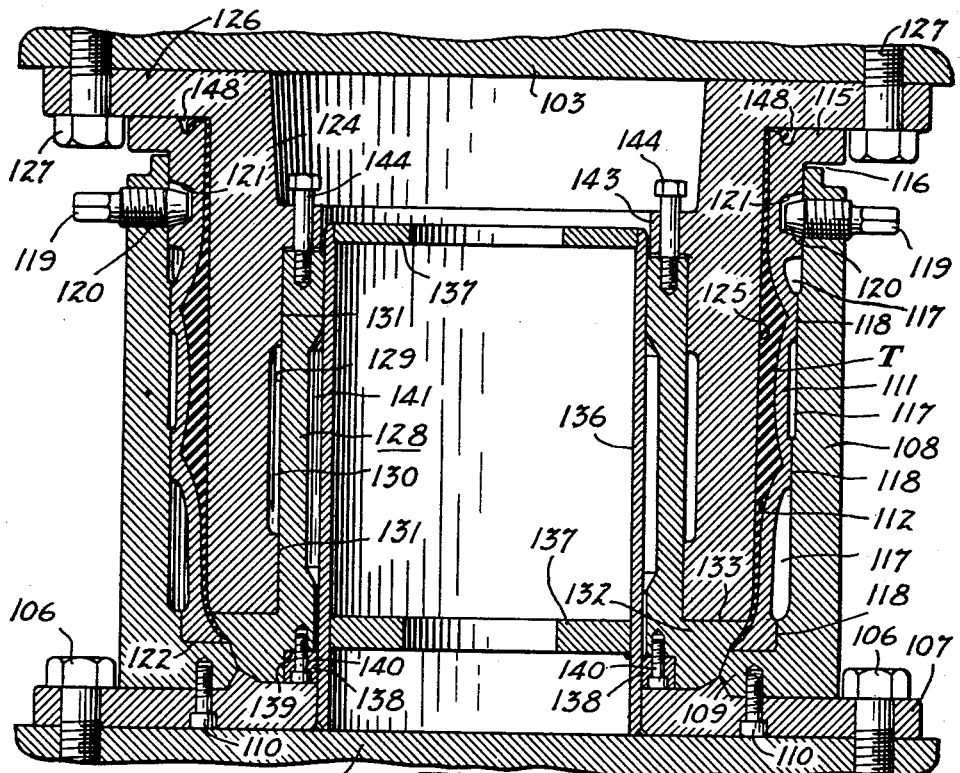
Fig. 3
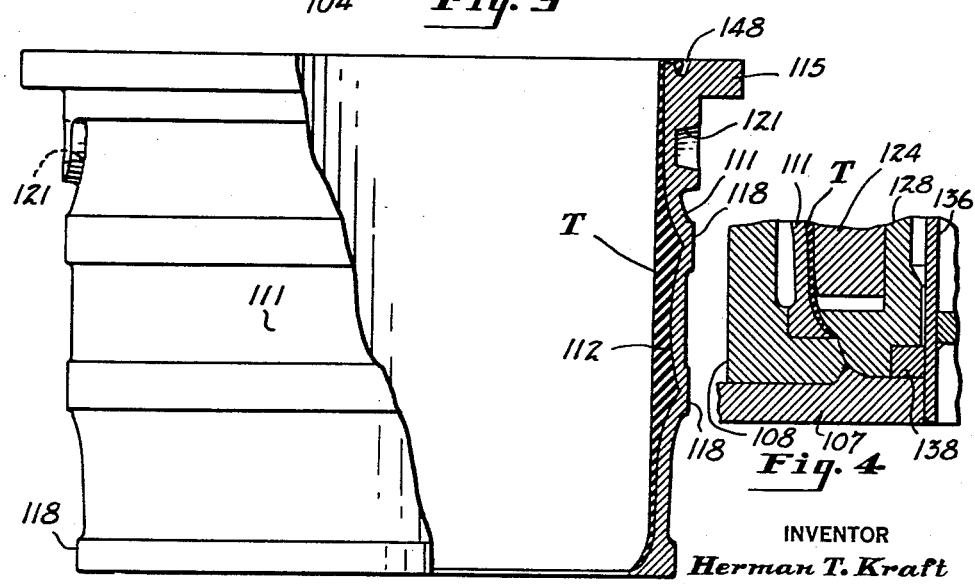
Fig. 5
Fig. 4
INVENTOR
Herman T. Kraft
BY McCoy, Greene & Te Grotenhuis
ATTORNEYS

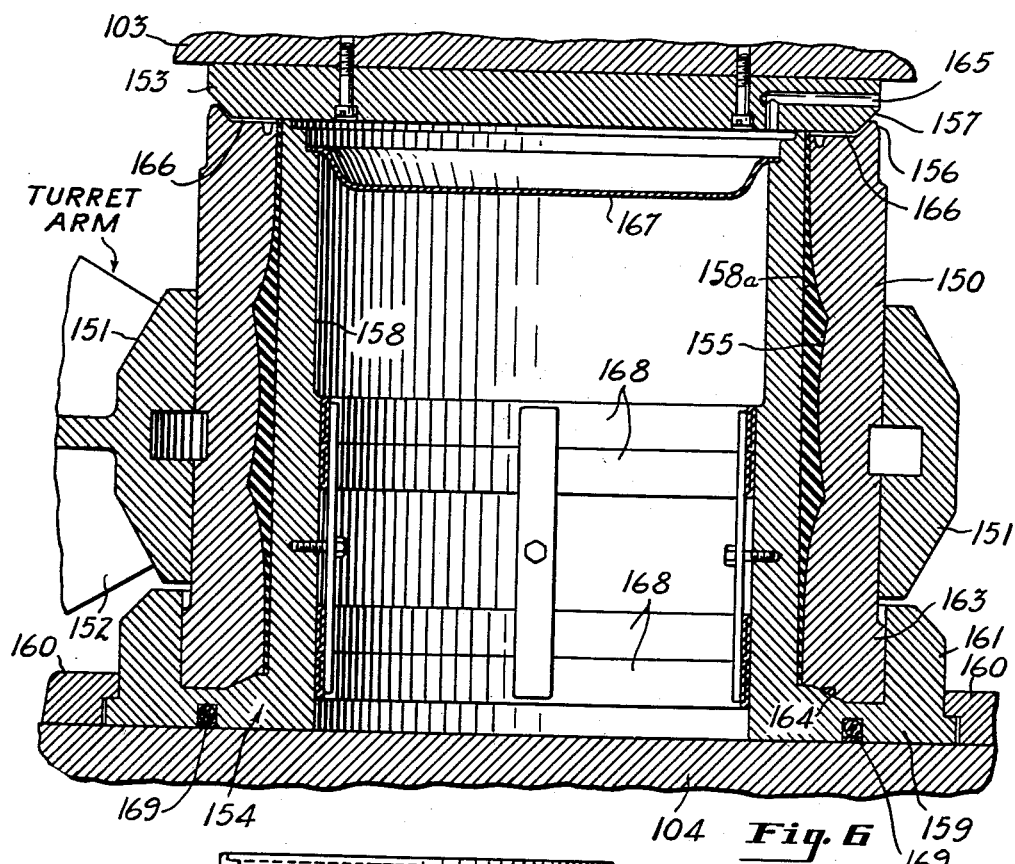
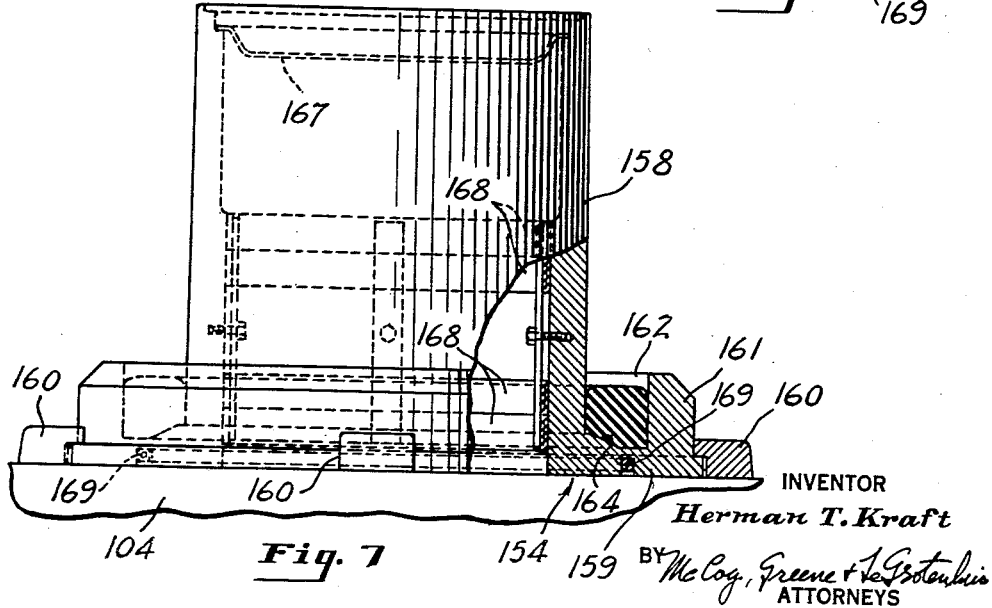

United States Patent Office 2,963,743
Patented Dec. 13, 1960

2,963,743

APPARATUS FOR MOLDING A SEAMLESS ANNULAR TREAD BAND

Herman T. Kraft, Akron, Ohio, assignor to The General Tire & Rubber Company, Akron, Ohio, a corporation of Ohio Filed Oct. 7, 1958, Ser. No. 765,853

13 Claims. (Cl. 18—42)

This invention relates to apparatus for molding a seamless annular tread band for assembly with a ply band to form a tire casing as described in my Patent No. 2,614,056, granted October 14, 1952, for Method of and Apparatus for Forming Tire Bands and Band So Formed, the present application being a continuation-in-part of my copending applications, Serial No. 267,580, filed Jan. 22, 1952 and Serial No. 471,016, now abandoned filed Nov. 24, 1954, the entire subject matter of the present application having been disclosed in the said copending applications.

The present invention provides a transfer or injection molding apparatus in which a preformed slug of uncured rubber is compressed between inner telescopically interfitting mold parts during movement of the mold parts to their molding position where they form between them an annular mold cavity in which an interiorly cylindrical tread band is formed. The mold cavity is formed between an inner cylindrical core member and a tubular internally recessed outer member which retains the molded tread band upon separation of the mold members. The telescopically interfitting mold parts are interposed between relatively movable press members and the mold is formed to provide an annular slug receiving charging chamber between relatively movable mold parts from which rubber is forced into an end of the mold cavity during the final portion of the closing movement of the mold. The rubber slug, preferably in the form of an annulus or ring, is predetermined in amount or quantity so that substantially the entire slug, save for a reasonable flash and waste overflow, is consumed in a single shot molding operation. The relatively small amount of flash and overflow waste is readily and subsequently removed from the molded tread band. The telescoping mold parts are thus brought together progressively under forces as high as necessary to obtain the desired flow of the confined rubber into and through the relatively thin sectioned portions of the progressively contracting molding cavity. This feature is particularly advantageous for tread molding in that high pressures are developed where needed and at least partially within the cavity to effect complete filling of the mold.

This invention also provides molding apparatus employing a single press which will permit molding of tread bands and application of the tread bands to fabric ply bands simultaneously. One way of accomplishing this result is to provide a removable sleeve or liner within which the inwardly directed circular sectioned mold surface to which the molded tread band adheres is formed, so that by providing a plurality of such liners for use sequentially in the apparatus, the press or other device used to bring the mold parts together can produce the treads rapidly for assembly with ply bands at a station or stations which may be remote from the molding apparatus. Another way of accomplishing a similar result is to support tubular mold members in which the mold cavity is formed independently of the relatively movable components of the press, so that one may be positioned in the press while another is positioned clear of the press.

A further feature of this invention is the provision of an arrangement for clamping the molded tread band in place during parting of the mold sections. This aspect of the invention is concerned with the provision of a clamping member or element preferably comprising part of the inner mold member which remains in clamping relation against one of the tread band margins at the start of the mold parting operation and which subsequently, as by means of a lost motion connection, is picked up or carried along with the other part or parts of the inner mold member. In a specialized version the inner mold member comprises a pair of telescoping elements the inner of which has a lost motion connection with the outer and carries at one end a clamping ring which is adapted to define the inner wall of the molding cavity at one end of the latter so as to remain in engagement with one end of the molded tread band during the initial withdrawing of the outer part of the inner mold member from the molded tread band.

Important objects of the invention are to provide a transfer molding press for forming an internally cylindrical tread band of uncured rubber between an external tubular mold part and an externally cylindrical inner mold part and to provide a tubular mold part that can be removed from the press with a molded tread band therein so that a tread band may be molded while another tread band is being applied to a tire carcass.

Other objects and advantages of the invention, relating to particular details of construction and combinations and arrangements of parts are set forth in the following detailed description of suitable embodiments of the invention. This description is made in connection with the accompanying drawings forming a part of the specification.

In the drawings:

Figure 1 is a diagrammatic vertically shortened elevational view, partly in section and with parts broken away and removed, of a press having a tread band molding system embodying the principles of the present invention;

Fig. 2 is a sectional detail showing the molding action in which a confined slug of rubber is forced from a charging chamber into the tread molding cavity during the closing of the mold, this view being enlarged with respect to Fig. 1;

Fig. 3 is a vertical sectional detail through the mold showing the mold parts closed in the provision of the cavity for forming an annular tread band, this view being enlarged with respect to Fig. 1;

Fig. 4 is a sectional detail similar to Fig. 2 showing the relationship of the members or components of the mold parts during the withdrawal of the inner mold part from the outer mold part after a molding operation;

Fig. 5 is an elevational view, partly in section and with parts broken away and removed, of the removable shell or liner sleeve removed from the body member of the outer mold part, this view showing the annular molded tread band adhered to the inner or cavity defining face of the liner sleeve;

Fig. 6 is a vertical section taken centrally through a mold of modified construction and showing portions of the lower movable press platen and of the stationary press head; and Fig. 7 is a side elevation of the inner mold member carried by the movable press platen, a portion thereof being broken away to show the annular rubber receiving trough in section.

As shown in Figs. 1 to 5 of the drawings, the molding or shaping of an annular rubber tread band T is effected in a vertical press P by a transfer or injection molding technique wherein a blank or slug S of rubber of predetermined quantity or volume is placed in a confined chamber in the press and is caused to flow into a molding cavity by the coming together as in a telescoping movement of the mold parts which define the molding cavity. The press P may be any of the conventional or well-known types and is diagrammatically illustrated. It comprises a base 101 carrying a number of upright tension members or guide rods or columns 102 disposed at opposite sides or corners of the press. The upright rods or columns are surmounted by a stationary cross member or head platen 103. A movable lower platen 104 is carried by and guided on the rods or columns 102, being actuated for movement both toward and away from the stationary head by a pneumatic or hydraulic piston and cylinder assembly or ram 105 of the double acting type. Suitable controls are provided for governing the operation of the press at the will of the operator.

Mounted on the movable platen 104 and secured thereto as by cap screws or bolts 106 is the lower or outer mold part or assembly of a transjection or displacement molding system. This lower assembly is made of machined steel and light metal components and comprises a ring-like steel base member 107 on which is supported a generally cylindrical steel mold body 108 having an inwardly directed circular flange 109 resting on the upper surface of the base ring. Cap screws 110 disposed at circumferentially spaced intervals about the ring 107 are threaded into the body flange 109 to fasten the body securely to the base ring so as to prevent separation of the parts. The heads of the cap screws are countersunk into the underside of the base ring to permit the latter to seat firmly against the top surface of the movable press head 104. Within the mold body 108 is nested a removable shell or cavity defining sleeve 111 which may be formed of steel like the mold body and base ring or, for ease in handling, may comprise an aluminum or other light metal casting. This sleeve is completely annular in extent and has an inner cavity defining face 112 in the form of a surface of revolution generated by rotating an element of the desired contour about the center or vertical axis of the mold assembly. This cavity defining surface is highly polished or otherwise treated to prevent adhesion to the tread rubber since it shapes the external surface of the tread band T and must separate readily from the tread band when the latter is contracted circumferentially upon shrinkage of the ply band to which the tread band is adhered in the present tire making process.

An annular outwardly directed radial flange 115 formed integrally on the upper end of the sleeve 111 overlaps the body member 108, the latter being formed with a circumferential relief indicated at 116 for receiving a suitable tool for use in prying the sleeve out of the body member should the parts become difficult to separate. The confronting faces of the body member 108 and the removable sleeve 111 are formed to define a number of reliefs 117 so that friction between the parts is reduced thereby facilitating withdrawal of the sleeve. Circumferential contact is maintained between the opposed faces of the mold member and the removable sleeve at lands or zones 118 spaced vertically or axially along the mold.

A number of radially disposed screw pins 119 are received in threaded holes located at points spaced circumferentially about the mold body 108. Inner tapered ends 120 on the screw pins 119 are received in larger sockets 121 of corresponding taper formed in the shell or sleeve 111. The location of the screw pins and the sockets 121 is such that by tightening the pins the inclined faces on the tapered ends 120 engage the correspondingly tapered walls of the sockets 121 so as to force the shell to move axially downwardly to hold lower end face 122 of the shell against the matching flat upper surface of the body flange 109.

The upper or inner mold part or assembly of the mold system is made of machined steel components and comprises a hollow tubular body member 124 receivable within the lower assembly and having an external surface of revolution 125 which, with the face 112 of the sleeve 111, defines the molding cavity. The face 125, although of generally cylindrical shape, is slightly tapered to facilitate withdrawal of the internal body member of the mold from the tread band annulus. So that the internal mold member 124 may be stripped or withdrawn readily from the molded rubber, the face 125 is even more highly polished than the contoured face 112 of the outer molding shell 111. Preferably the surface 125 comprises a plating or coating of chromium or similar metal capable of forming a smooth highly polished surface. Alternatively, the surface 125 may be formed by a band of smooth plastic material such as polytetrafluoroethylene molded in place or separately molded and then placed about the body member 124.

A radial flange 126 is formed integrally on the upper end of the mold body 124, this flange preferably being annular in extent and receivable flatwise against the underside of the upper press head 103. Cap screws 127 received through the flange 126 and threaded into the upper platen or press head 103, or other conventional attaching means, are used to fasten the mold member 124 securely against the underside of the platen or head 103.

The upper or internal mold assembly also includes a supplemental sleeve 128 received telescopically within the generally cylindrical body member 124 for relative axial or vertical sliding movement. The sleeve 128 is formed with an external cylindrical surface 129 that has a sliding fit in the center cavity or bore formed in the upper mold member 124. The surface of the internal bore may be relieved as indicated at 130 to provide lands 131 with which the surface of the sleeve 128 is slidably engaged.

At its lower end, the sleeve 128 is formed with an integral outwardly extending ring portion 132 that underlies the bottom end of the mold member 124. The ring portion is arranged to seat snugly against the lower end face of the mold member 124 at parting line 133 (Fig. 3). The outer face of the ring portion of the auxiliary sleeve forms a continuation of the molding surface 125 and is highly polished, plated or coated similarly to the latter.

During the closing of the mold, as will later appear, the ring portion engages the raw rubber annulus or slug S (Fig. 1) to exert pressure on the latter and to force it into the molding cavity during the process in which the tread band is formed. To confine the raw rubber slug and also to act as a guide or pilot for insuring correct orientation of the mold parts or assemblies as they move together, a hollow post which may take the form of a cylindrical steel tube 136 is received in the center hollow in the base ring 107 and is secured to the latter as by welding. The steel tube 136 is fitted with internal reinforcing rings 137 welded in place. A sealing ring 138 of brass or similar material is received in an annular rabbet 139 formed in the lower end of the supplemental sleeve 128, the sealing ring being secured in place in the supplemental sleeve as by recessed cap screws 140. The sealing ring closely embraces the post or tube 136, the outer surface of the latter preferably being smooth or polished to permit sliding of the sealing ring axially thereover in the maintenance of a seal between the parts. The portion of the supplemental sleeve 128 that surrounds the guide post 136 above the sealing ring 138 has a free or sliding fit over the guide post and may be formed to provide one or more annular reliefs or clearance spaces such as that indicated at 141. The vertical height of the guide post 136 is not critical but it is preferable that it be made almost as tall as the removable sleeve or shell 111 so as to be engaged by the upper mold parts substantially as soon as the latter start to enter the lower mold parts in the closing of the mold. A circular internal flange 143 formed integrally on the upper mold member 124 has axial drill holes at circumferentially spaced points to receive a plurality of shouldered cap screws 144 that are screwed into the upper end face of the supplemental sleeve 128. The unthreaded or cylindrical shank portions of the cap screws 144 are of greater length than the corresponding holes in the flange 143 and are freely slidable therein to permit vertical shifting of the supplemental sleeve relative to the mold body member 124. This relative movement of the parts of the upper or internal mold assembly permits the supplemental sleeve to clamp or hold the molded tread in place while the main body member 124 of the upper mold assembly is parted from the molded tread band in the withdrawal of the internal mold parts from the shell or sleeve 111 after each tread shaping operation.

In utilizing the apparatus of Figs. 1 through 5 to mold an annular tread band the press P is opened to locate the parts in the positions shown in full lines in Fig. 1. The annular ring or slug S or raw rubber compound is then placed about the guide cylinder 136 of the lower or outer mold part and is received in the bottom of the annular pocket 145 defined by the sleeve 111, the guide 136 and the base ring 107. The rubber slug S is preferably formed as by a preliminary molding operation to fit loosely into the annular pocket and to contain a quantity of rubber slightly but not greatly in excess of the volumetric capacity of the molding cavity so that substantially all of the rubber of the slug is used in the molding operation leaving little excess or scrap.

With the annular rubber slug S positioned as shown in Fig. 1, the mold is closed by actuating the ram to move the lower platen 104 upwardly substantially to the broken line position indicated. In this mold closing movement the inner or upper mold part carried by the press head or platen 103 telescopes into the lower or outer mold part carried by the movable platen 104. The cylindrical guide 136 is embraced by the inner mold part and constrains the parts to relative telescopic movement over a predetermined axial path in which the spacing between the confronting cavity defining faces is held within close limits to insure accurate dimensioning of the tread band.

When the end ring 132 of the inner mold member engages the rubber slug in the bottom of the mold pocket 145 the lost motion connection between the end ring and the inner mold body 124 is taken up and the face of the end ring seats snugly against the bottom of the inner mold body 124. The bottom of the annular pocket 145 thus becomes an annular charging chamber in which the slug annulus S is confined between the inner and outer mold parts (Fig. 2) so that continued closing of the mold forces the rubber to flow upwardly into the annular space between the spaces of the mold parts definitive of the molding cavity. The rubber flows into the mold cavity from the annular charging chamber through a progressively narrowing gate defined by an annular surface 146 on the flange 109 of the mold body 108 and a matching surface 147 on the ring 132 of the inner mold part. The flow from the charging chamber into the mold cavity is generally upwardly and radially outwardly over an oblique path completely annular in extent, or substantially so. There is thus a slight radial expansion of the rubber from the slug S into the tread band T as well as a considerable axial elongation and reduction in section.

As the closing of the mold is completed the charging chamber is substantially exhausted of rubber and the annular gate between the annular surface 146 and 147 is substantially closed. During the final stages of the closing extremely high pressures are developed within the charging chamber, the cap screws 110 being called upon to prevent separation between the outer mold body 108 and the base ring 107. The locking pins 119 prevent separation between the sleeve 111 and the flange 109 of the outer mold body at the parting line 122, and the sealing ring 138 prevents objectionable flow of rubber between the cylindrical guide 136 and the end ring 132.

At the upper end of the molding cavity excess rubber is permitted to escape into an annular channel or recess 148 formed in the meeting faces at the parting line between the flange 115 of the removable sleeve and the flange of the inner mold body 124. Suitable bleeder holes or clearances are provided between the molding cavity and the recess 148 to permit excess rubber to escape from the molding cavity.

Upon completion of the molding operation the mold is opened by lowering the movable platen 104. The telescoping mold parts are tapered longitudinally to facilitate the opening of the mold by reducing the drag of the tread band T on the inner mold member 124. The amount of taper is very slight, being of the order of about 1° or less, a taper of about .5° being satisfactory. It is understood, of course, that the cavity defining face 112 of the removable sleeve 111 is dimensioned to accommodate the taper of the inner mold member 124 so that the quantity or amount of rubber is the same in each of the upper and the lower thin-sectioned portions of the tread band.

At the start of the mold opening movement the inner mold member 124 shifts axially relative to the outer mold member (Fig. 4) and becomes free of the tread band T while the end ring 132 remains in its closed or molding position clamping or holding the lower end or margin of the tread band outwardly against the confronting and confining wall of the liner 111. This feature of holding or clamping the bottom circular margin of the tread band during the initial withdrawing movement of the inner mold member resists any tendency of the molded tread band to "follow" the inner mold member or to roll out of the sleeve 111 as the mold parts are separated. The lost motion connection between the supplemental sleeve 128 and the inner mold member 124 "picks up" the end ring 132 as the withdrawing action continues, but after the surface of the inner mold member 124 is substantially free of the molded tread band. The rubber of the molded tread band T parts from the inner mold members and remains adhered to the surface 112 of the liner sleeve 111 by reason of the taper of the parts, the more highly polished surface, or plastic surface on the inner mold member 124 and the greater area of the surface 112, as well as the initial holding of the lower margin of the tread band by the ring 132. The cylindrical guide 136 keeps the mold assemblies in correct axial alignment during the withdrawing action to prevent the parts of the inner mold assembly from contacting the walls of the tread band thereby minimizing tearing or other damage to the inner surface of the tread band.

After lowering of the platen 104 to withdraw the outer mold assembly from about the inner mold assembly the removable sleeve or liner 111 is lifted out of the outer mold body 108, the locking pins 119 being first backed off or withdrawn to release the liner. The withdrawn liner 111 with the tread band therein as shown in Fig. 5, may then be taken to the station where the molded tread band is applied to a ply band and withdrawn from the liner 111 as shown in my patent above referred to, and an empty sleeve or liner may be placed in the outer mold member 108.

Figs. 6 and 7 show a modified mold structure that has a mold part in the form of a tubular member 150 mounted in a ring 151 at the outer end of a turret arm 152, a closure member 153 in the form of a circular plate bolted to the bottom face of the stationary head 103 of a press which may be identical with the press shown in Fig. 1, and a second mold part 154 mounted on the movable lower platen 104 for movement telescopically into and out of the tubular member 150. With a tubular mold member 150 on each of a plurality of turret arms 152, the machine may be operated to mold a tire tread band in one outer mold member 150 while a tread band in another mold member 50 is being transferred from the mold member 150 to a ply band.

The tubular mold member 150 has a recessed interior face 155 that conforms to the outer face of a tire tread band and a beveled positioning flange 156 at its upper end that receives a beveled peripheral edge 157 of the upper mold member 153.

The mold member 154 has a tubular core portion 158 with a cylindrical external face 158a that extends the full length of the tubular mold member 150 when the mold is closed as shown in Fig. 6 and that forms the interior wall of the mold cavity. The confronting faces 155 and 158a provide a mold cavity conforming to a tread band with relatively thin annular end portions and a relatively thick annular central portion. The lower mold member 154 has an integral annular base portion 159 that extends radially outwardly from the core portion 158 and that is attached to the movable platen 104 by suitable means such as clamping blocks 160. The base portion 159 has an internally cylindrical flange 161 spaced radially outwardly from the core portion 158 to provide an annular recess or channel 162 that provides a charging chamber surrounding the core portion 158 that receives the lower end of the tubular mold member 150 when the mold is closed, the mold member 150 having an enlarged externally cylindrical lower end portion 163 that fits within the flange 161 and that serves as a plunger for forcing rubber from the chamber 162 into the molding cavity.

The annular recess 162 between the flange 161 and the core portion 158 receives a ring of rubber as shown in Fig. 7, which is pressed between the plunger portion 163 of the mold member 150 and the bottom of the recess 162 and caused to flow upwardly between the lower end of the mold member 150 and the core portion 158 into the mold cavity when the lower mold member 154 is raised to mold closing position. The chamber 162 is of a size to receive a ring of rubber of a volume sufficient to fill the mold cavity and, to facilitate the flow of rubber from the recess 162 to the mold cavity during the final portion of the closing movement of the lower mold member 154, the inner portion 164 of the recess bottom is inclined upwardly. The lower end of the interior face 155 of the outer tubular mold member 150 is of slightly greater diameter than the cylindrical outer face of the core portion 158 so that a narrow annular gate is provided through which the rubber may flow from the chamber 162 into the molding cavity. One or more vent passages 165 are formed in the upper mold member 153 to allow free escape of air during the upward travel of the ram while the core portion 158 is moving upwardly within the tubular mold member 150. Vent grooves 166 are provided in the top edge of the tubular mold member 150 through which air and excess rubber may escape during the final closing movement of the lower mold member 154. The upper end of the tubular core portion 158 is closed by a dished closure member 167 that serves to catch any excess rubber forced past the top edge of the core portion 158 during the final portion of its upward movement. Suitable electrical resistance heating rings 168 and 169 may be provided, the rings 168 being within the core portion 158 and the rings 169 beneath the channel 162 to heat the rubber and facilitate its flow during the closing of the mold.

As in the mold first described, the lower press platen 104 moves from a lower position where the core portion 158 is below and entirely clear of the outer mold member 150 to the closed position shown in Fig. 6.

The recessed inner face 155 of the tubular outer mold member 150 and the external face of the core portion 158 are highly polished or otherwise treated to lessen adhesion to the unvulcanized tread rubber and the external face of the core portion 158 may have a slight upward taper corresponding to that of the face 125 of the inner mold member of the mold shown in Figs. 1 to 5.

It is to be understood that in accordance with the provisions of the patent statutes, variations and modifications of the specific devices herein shown and described may be made without departing from the spirit of the invention.

What I claim is:

1. Apparatus for shaping tire tread bands comprising a mold having inner and outer mold parts receivable one within the other and relatively movable telescopically for opening and closing the mold, the outer part including a tubular body member and a removable internal sleeve slidably fitting within said body member, the sleeve and the inner mold part having spaced internal and external confronting surfaces, said inner mold part having a substantially cylindrical exterior surface and said sleeve having an interior surface formed to provide a molding cavity including spaced annular end portions of relatively thin section and a central annular portion of relatively thick section disposed between the end portions, means for guiding the mold parts for relative axial movement during telescopic assembly, and means for forcing rubber into the cavity, the sleeve being separable from the body member of the outer mold part for facile removal thereof with a molded tread band therein from such body member.

2. Apparatus for shaping tire tread bands comprising a mold having inner and outer mold parts receivable one within the other and relatively movable telescopically for opening and closing the mold, the outer part including a tubular body member and a removable internal sleeve that slidably fits within said body member, the sleeve and the inner mold part having spaced confronting interior and exterior surfaces, said inner mold part having a substantially cylindrical exterior surface and said sleeve having an interior surface formed to provide a molding cavity including spaced annular end portions of relatively thin section and a central annular portion of relatively thick section disposed between the end portions, means for guiding the mold parts for relative axial movement during telescopic assembly, means for forcing rubber into the cavity, the sleeve being separable from the body member of the outer mold part for facile removal thereof with a molded tread band therein from such body member, and means for locking the sleeve in the outer mold part to prevent relative movement therebetween during molding and during withdrawal of the inner mold part from a molded tread band.

3. Apparatus for shaping tire tread bands comprising a mold having inner and outer mold parts receivable one within the other and relatively movable telescopically for opening and closing the mold, the outer part including a tubular body member and a removable internal sleeve that slidably fits within said body member, the sleeve and the inner mold part having spaced confronting interior and exterior surfaces, said inner mold part having a substantially cylindrical exterior surface and said sleeve having an interior surface that provides a molding cavity including spaced annular end portions of relatively thin section and a central annular portion of relatively thick section disposed between the end portions, the inner mold part including a body member and an end ring that is movable axially relative to said body member toward and away from the same and that is engageable with said body member on a parting line intermediate the ends of the molding cavity when the mold parts are together, means for guiding the mold parts for relative axial movement during telescopic assembly, and means for forcing rubber into the cavity, the sleeve being separable from the body member of the outer mold part for facile removal thereof with a molded tread band therein from such body member.

4. Apparatus for shaping tire tread bands comprising a mold having inner and outer mold parts receivable one within the other and relatively movable telescopically for opening and closing the mold, said mold parts having spaced confronting interior and exterior surfaces, said inner mold part having a substantially cylindrical exterior surface and said outer mold part having an interior surface formed to provide a molding cavity surrounding the cylindrical outer surface of said inner mold part and including spaced annular end portions of relatively thin section and a central annular portion of relatively thick section disposed between the end portions, means for guiding the mold parts for relative axial movement during telescopic assembly, the inner mold part including a body member and an end ring that is movable axially relative to said body member toward and away from the same and that is engageable with the body member on a parting line intermediate the ends of the molding cavity when the mold parts are together, the external periphery of said ring and the portion of said outer mold member surrounding the same when the mold is closed having substantially complemental tapering faces, and means for forcing rubber into the cavity.

5. Apparatus for shaping tire tread bands comprising a mold having inner and outer mold parts receivable one within the other and relatively movable telescopically for opening and closing the mold, the mold parts having spaced exterior and interior confronting surfaces formed to define an annular tread band molding cavity of relatively thin radial section, the inner mold part including a body member having a substantially cylindrical exterior surface and an end ring that forms part of the inner wall of the molding cavity, that is relatively movable with respect to said body member toward and away from the same and that is engaged by said body member on a parting line intermediate the ends of the molding cavity when the mold parts are together, the external periphery of said ring and the portion of said outer mold member surrounding the same when the mold is closed having substantially complemental inwardly tapering faces, means providing a lost motion connection between the body member and the end ring to permit partial withdrawal of the body member from the outer mold part while the end ring and the outer mold part remain relatively stationary in clamping relation on a molded tread band, and means guiding the mold parts for relative axial movement during opening and closing.

6. Apparatus for shaping tire tread bands comprising a mold having inner and outer mold parts receivable one within the other and relatively movable telescopically for opening and closing the mold, the mold parts having spaced exterior and interior confronting surfaces formed to define an annular tread band molding cavity of relatively thin radial section, the inner mold part including a body member having a substantially cylindrical exterior surface and an end ring that forms part of the inner wall of the molding cavity, that is relatively movable with respect to said body member toward and away from the same and that is engaged by said body member on a parting line intermediate the ends of the molding cavity when the mold parts are together, the external periphery of said ring and the portion of said outer mold member surrounding the same when the mold is closed having substantially complemental inwardly tapering faces, the end ring and the body member having telescoped guide elements constraining such end ring and body member to relative axial movement, the body member being arranged for withdrawdrawal movement from the outer mold part independently of the end ring to permit the end ring and the outer mold part to remain relatively stationary in clamping relation on a molded tread band, and means guiding the mold parts for relative axial movement during opening and closing.

7. Apparatus for shaping tire tread bands comprising a mold having inner and outer mold parts receivable one within the other and relatively movable telescopically for opening and closing the mold, the mold parts having spaced exterior and interior confronting surfaces formed to define an annular tread band molding cavity of relatively thin radial section, the inner mold part including a body member having a substantially cylindrical exterior surface and an end ring that forms part of the inner wall of the molding cavity, that is relatively movable with respect to said body member toward and away from the same and that is engaged by said body member on a parting line intermediate the ends of the molding cavity when the mold parts are together, the external periphery of said ring and the portion of said outer mold member surrounding the same when the mold is closed having substantially complemental inwardly tapering faces, the end ring and the body member having telescoped guide elements constraining such end ring and body member to relative axial movement, means providing a lost motion connection between the body member and the end ring to permit partial withdrawal of the body member from the outer mold part while the end ring and the outer mold part remain relatively stationary in clamping relation on a molded tread band, and means guiding the mold parts for relative axial movement during opening and closing.

8. Apparatus for shaping tire tread bands comprising a mold having inner and outer mold parts receivable one within the other and relatively movable telescopically for opening and closing the mold, the mold parts having spaced exterior and interior confronting surfaces formed to define an annular molding cavity of relatively thin radial section, a cylindrical axially extending guide in the outer mold part, the inner mold part being formed to slide over the guide during closing of the mold to hold the mold parts in axial alignment, the mold parts being formed with portions including said guide shaped cooperatively to define an annular chamber adjacent one end of the molding cavity, said chamber forming portions of the mold parts being arranged to move together during closing of the mold to progresisvely decrease the volume of the charging chamber and thereby force a contained charge of rubber to flow into the molding cavity, the portions of said confronting faces adjacent the charging chamber being tapered toward the bottom of said chamber and providing an annular gate between the molding cavity and the charging chamber during the closing movement of the mold parts, the gate defining portions of said surfaces being formed to fit one within the other when the mold is closed.

9. Apparatus for shaping tire tread bands comprising a mold having inner and outer mold parts receivable one within the other and relatively movable telescopically for opening and closing the mold, said mold parts having spaced exterior and interior confronting surfaces, said inner mold part having a substantially cylindrical exterior surface and said outer mold part being formed to provide a molding cavity including spaced annular end portions of relatively thin section and a central annular portion of relatively thick section, the mold parts being formed with portions shaped to define a charging chamber that communicates with the lower end of the molding cavity during the closing movement of the mold parts, said inner mold parts being movable into said charging chamber during closing of the mold to progressively decrease the volume of the charging chamber and thereby force a contained charge of rubber to flow into the molding cavity, means for guiding the mold parts for relative axial movements, said confronting surfaces having end portions adjacent the charging chamber that taper toward the bottom of the charging chamber and that provide an annular gate between the charging chamber and the molding cavity through which the rubber may flow during the movement of the inner mold part into the charging chamber, the gate defining portions of said surfaces being formed to fit one within the other below the mold cavity to close the gate when the mold is closed.

10. Apparatus for shaping tire tread bands comprising a mold having inner and outer mold parts receivable one within the other and relatively movable telescopically for opening and closing the mold, said mold parts having spaced exterior and interior confronting surfaces formed to define an annular molding cavity, said cavity including spaced annular end portions of relatively thin section and a central annular portion of relatively thick section disposed between the end portions, the inner mold part including a body member that forms part of the inner wall of the mold cavity and a relatively movable end ring that is engaged by said body member on the parting line intermediate the ends of the molding cavity when the mold parts are in closed position, said body member being movable axially relative to said ring toward and away from said parting line, said mold parts being formed to provide a charging chamber into which said end ring is moved as the mold parts are moved to closed position, said outer mold part and said end ring being formed with opposed interior and exterior faces that taper toward the bottom of the charging chamber and that provide a gate through which rubber may flow from the charging chamber to the molding cavity, said opposed tapering faces being formed to fit together when the mold is closed.

11. Apparatus for shaping tire tread bands comprising a mold having two parts receivable one within the other telescopically and relatively movable axially to a closed position where they form an annular molding cavity between them, said mold parts having radially spaced exterior and interior confronting surfaces that form the interior and exterior walls of the molding cavity, said exterior surface being cylindrical and said interior surface being recessed to provide the molding cavity with annular end portions of relatively thin section and a central annular portion of relatively thick section, the one of said relatively movable mold parts that has a cylindrical exterior surface being provided at its lower end with integral portions shaped to provide an annular charging chamber in the form of an open top channel with radially spaced inner and outer annular walls for receiving a charge of rubber, said charging chamber surrounding the lower end of said cylindrical surface and the outer wall thereof being internally cylindrical and coaxial with said cylindrical surface, the other of said relatively movable mold parts having lower end portions shaped to provide an annular plunger with radially inner and outer annular faces that are received between said annular walls, the inner of said annular walls of said chamber and the inner of said annular faces of said plunger being the lower end portions of said confronting surfaces and being spaced apart radially to provide a narrow annular gate connecting said chamber with the molding cavity, the outer of said annular walls and the outer of said annular faces being interfitting cylindrical surfaces coaxial with and spaced radially from said annular gate, said plunger entering said charging chamber during the final closing movement of the mold parts to progressively decrease the volume of the charging chamber and force the contained charge of rubber to flow upwardly through said narrow annular gate into the molding cavity.

12. Apparatus according to claim 11 for shaping an endless tire tread band in which the mold part with the cylindrical exterior surface forming the interior wall of the mold cavity is a tubular member that is provided interiorly with heating means.

13. Apparatus according to claim 11 for shaping an endless tread band in which the mold parts are clamped between relatively movable press members, in which the mold part forming the interior wall of the mold cavity and the charging chamber is attached to one of the press members and in which the mold part with the recessed internal face is supported independently of the press members.

References Cited in the file of this patent

UNITED STATES PATENTS

| | | |
|---|---|---|
| 683,979 | Petit | Oct. 8, 1901 |
| 2,615,203 | Du Pree | Oct. 28, 1952 |